United States Patent
Kluemper et al.

(10) Patent No.: US 8,060,286 B2
(45) Date of Patent: Nov. 15, 2011

(54) TORQUE CONVERTER CLUTCH CONTROL

(75) Inventors: Kevin L. Kluemper, Monrovia, IN (US); Jeffrey K. Runde, Fishers, IN (US); Robert M. Merrion, Pittsboro, IN (US)

(73) Assignee: GM Global Technology Operations LLC

( * ) Notice: Subject to any disclaimer, the term of this patent is extended or adjusted under 35 U.S.C. 154(b) by 544 days.

(21) Appl. No.: 12/348,430

(22) Filed: Jan. 5, 2009
(Under 37 CFR 1.47)

(65) Prior Publication Data
US 2010/0036572 A1 Feb. 11, 2010

Related U.S. Application Data

(60) Provisional application No. 61/086,584, filed on Aug. 6, 2008.

(51) Int. Cl.
*F16H 59/14* (2006.01)
*F16H 61/14* (2006.01)
*G06F 17/00* (2006.01)

(52) U.S. Cl. ........................................ 701/67; 192/3.29
(58) Field of Classification Search ........................ None
See application file for complete search history.

(56) References Cited

U.S. PATENT DOCUMENTS

| 6,085,136 | A | * | 7/2000 | Katakura et al. | 701/51 |
| 6,254,507 | B1 | | 7/2001 | Downs | |
| 6,695,111 | B1 | | 2/2004 | Bai | |
| 2008/0058161 | A1 | * | 3/2008 | Sieffert et al. | 477/176 |

* cited by examiner

*Primary Examiner* — Michael J. Zanelli (57) ABSTRACT

A clutch control system comprises a clutch torque determination module and a clutch pressure control module. The clutch torque determination module determines a desired torque value for a torque converter clutch (TCC) based on a torque output of an engine, a pump torque value for a pump integrated with a torque converter, a desired engine acceleration, and an inertia value of the engine. The clutch pressure control module selectively controls pressure applied to the TCC based on the desired torque value.

20 Claims, 6 Drawing Sheets

TORQUE CONVERTER CLUTCH CONTROL

CROSS-REFERENCE TO RELATED APPLICATIONS

This application claims the benefit of U.S. Provisional Application No. 61/086,584, filed on Aug. 6, 2008. The disclosure of the above application is incorporated herein by reference.

FIELD

The present disclosure relates to internal combustion engine systems and more particularly to torque converters.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Figure 1:
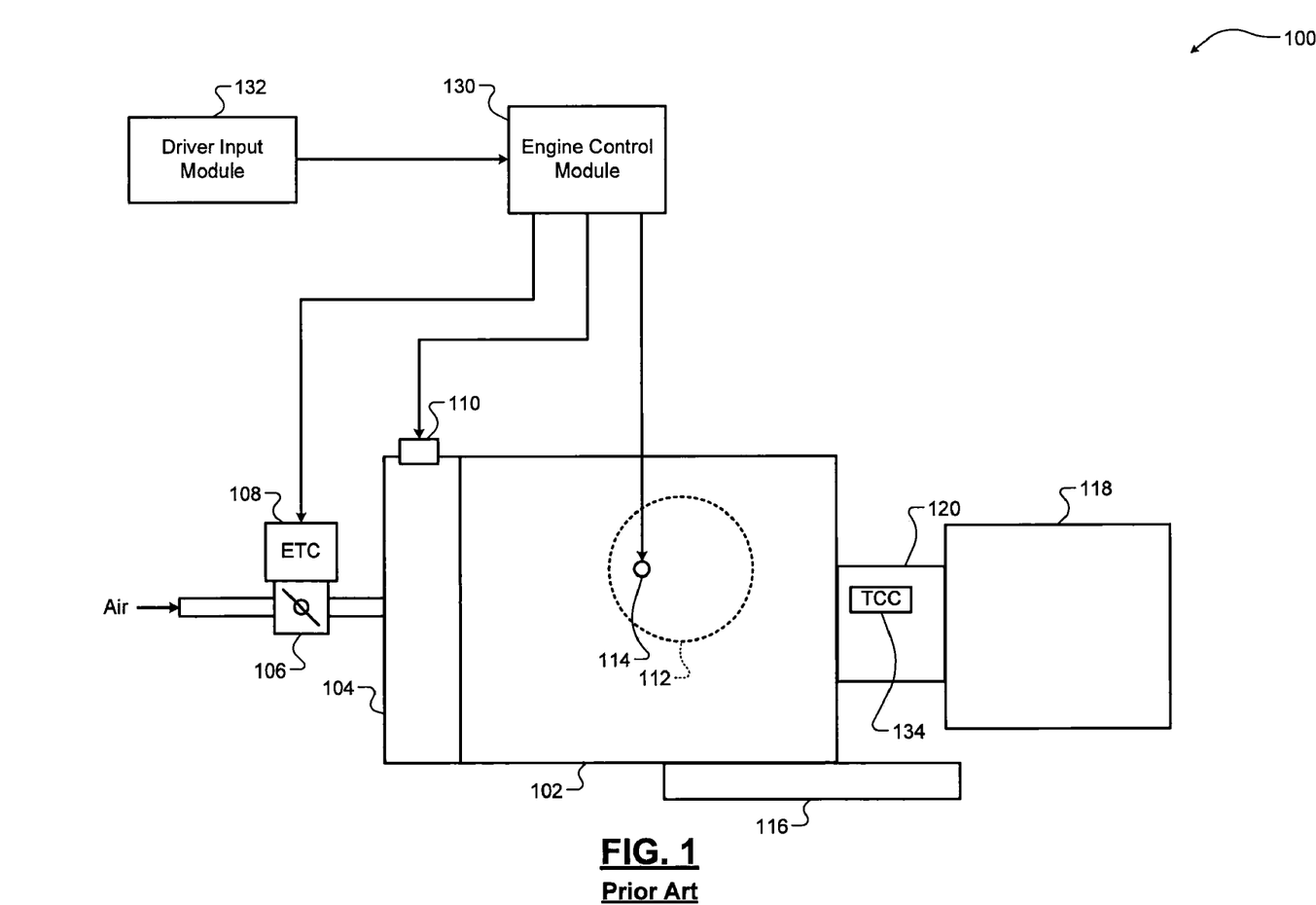
FIG. 1 is a functional block diagram of a powertrain system according to the prior art.

Referring now to FIG. 1, a functional block diagram of a powertrain system 100 of a vehicle is presented. The powertrain system 100 includes an engine 102 that generates drive torque to propel the vehicle. Air is drawn into the engine 102 through an intake manifold 104. A throttle valve 106 varies the volume of air drawn into the intake manifold 104. The throttle valve 106 is actuated by an electronic throttle controller (ETC) 108, which controls opening of the throttle valve 106. The air mixes with fuel provided by a fuel injector 110 to form an air and fuel mixture.

The air/fuel mixture is combusted within one or more cylinders of the engine 102, such as cylinder 112. Combustion may be initiated in any suitable manner. For example, in some engines, such as the engine 102, combustion of the air/fuel mixture is initiated by spark provided by a spark plug 114. Exhaust gas resulting from combustion is expelled from the cylinders to an exhaust system 116.

The engine 102 transfers torque to a transmission 118 through a torque converter 120. The transmission 118 may then transfer torque to one or more wheels of the vehicle. An engine control module (ECM) 130 controls torque output by the engine 102. For example, the ECM 130 may control torque output by the engine 102 based on driver inputs, such as an accelerator pedal position. A driver input module 132 provides driver inputs to the ECM 130.

Figure 2:
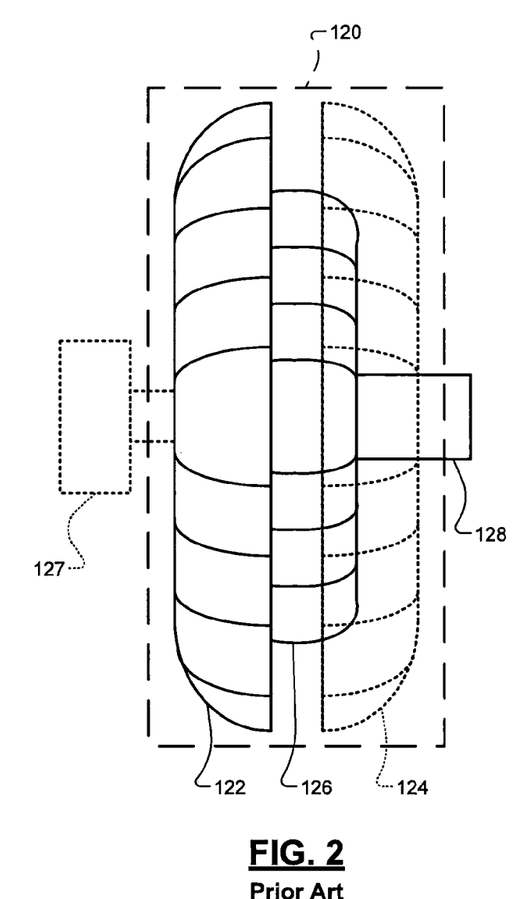
FIG. 2 is an exemplary illustration of a torque converter according to the prior art.

Referring now to FIG. 2, an exemplary illustration of the torque converter 120 is presented. The torque converter 120 includes a turbine 122, a pump 124, and a stator 126. The pump 124 is linked to an output shaft 127 of the engine 102, and thus rotates with the output shaft 127 of the engine 102. The pump 124 includes blades or fins that direct transmission fluid within the torque converter 120 radially outward as the pump 124 turns. Directing fluid to the outside of the torque converter 120 creates a vacuum (i.e., low pressure with respect to the pressure near the outside) toward the center of the torque converter 120.

Like the pump 124, the turbine 122 includes blades or fins. The blades of the turbine 122, however, direct the transmission fluid inward from the outside of the torque converter 120. The blades of the turbine 122 are arranged such that the transmission fluid flow through the turbine 122 rotatably drives the turbine 122. The turbine 122 is connected to and drives an input shaft 128 of the transmission 118.

Referring back to FIG. 1, the torque converter 120 also includes a torque converter clutch (TCC) 134. The TCC 134 is referred to as a lock-up clutch. The TCC 134 is engaged (i.e., applied) to link the pump 124 with the turbine 122. In this manner, the TCC 134 selectively links the output shaft 127 of the engine 102 with the input shaft 128 of the transmission 118.

The TCC 134 may be controlled in any suitable manner. For example only, application of the TCC 134 may be controlled by applying a fluid or a mechanical pressure to the TCC 134. Further description of the torque converter 120 and the TCC 134 can be found in commonly assigned U.S. Pat. No. 6,695,111 issued on Feb. 24, 2004 and entitled "Torque Converter and Clutch Control" and commonly assigned U.S. Pat. No. 6,254,507 issued on Jul. 3, 2001 and entitled "Reverse One-Way Torque Converter Clutch," the disclosures of which are incorporated herein in their entirety.

SUMMARY

A clutch control system comprises a clutch torque determination module and a clutch pressure control module. The clutch torque determination module determines a desired torque value for a torque converter clutch (TCC) based on a torque output of an engine, a pump torque value for a pump integrated with a torque converter, a desired engine acceleration, and an inertia value of the engine. The clutch pressure control module selectively controls pressure applied to the TCC based on the desired torque value.

In other features, the clutch torque determination module determines the desired torque value based on a difference between the torque output of the engine and a sum of the pump torque value and a product of the inertia value and the desired engine acceleration.

In still other features, the desired acceleration is determined relative to a current engine acceleration.

In further features, the desired engine acceleration is determined based on an estimated heating value for the TCC.

In still further features, the pump torque value is determined based on an engine speed and a speed of a turbine integrated with the torque converter.

In other features, the pump torque value is determined further based on a gain of the torque converter.

In further features, the clutch pressure control module is disabled when the engine speed is approximately equal to the turbine speed.

In other features, the clutch pressure control module controls the pressure applied to the TCC further based on a lookup table of pressures indexed by desired torque values.

In still other features, the clutch control system further comprises an actuator. The actuator applies pressure to the TCC based on a TCC pressure command. The clutch pressure control module generates the TCC pressure command based on the desired torque value.

In further features, the actuator applies a fluid pressure to the TCC based on the TCC pressure command.

A method comprises determining a desired torque value for a torque converter clutch (TCC) based on a torque output of an engine, a pump torque value for a pump integrated with a torque converter, a desired engine acceleration, and an inertia value of the engine. The method further comprises selectively controlling pressure applied to the TCC based on the desired torque value.

In other features, the desired torque value is determined based on a difference between the torque output of the engine and a sum of the pump torque value and a product of the inertia value and the desired engine acceleration.

In further features, the method further comprises determining the desired acceleration relative to a current engine acceleration.

In still further features, the method further comprises determining the desired engine acceleration based on an estimated heating value for the TCC.

In other features, the method further comprises determining the pump torque value based on an engine speed and a speed of a turbine integrated with the torque converter.

In further features, the pump torque value is determined further based on a gain of the torque converter.

In still further features, the method further comprises disabling the selectively controlling pressure when the engine speed is approximately equal to the turbine speed.

In other features, the pressure applied to the TCC is controlled further based on a lookup table of pressures indexed by desired torque values.

In further features, the method further comprises generating a TCC pressure command based on the desired torque value and applying pressure to the TCC based on a TCC pressure command.

In still further features, the applying pressure comprises applying a fluid pressure to the TCC based on the TCC pressure command.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A torque converter of a vehicle allows an engine to rotate at a different (e.g., higher) speed than a transmission. The torque converter includes a torque converter clutch that is selectively applied to mechanically link the output of the engine with the input of the transmission. The torque converter clutch draws torque from the engine when the input speed of the transmission is lower than the output speed of the engine.

A clutch control module according to the principles of the present disclosure controls the application of the torque converter clutch. More specifically, the clutch control module controls pressure applied to the torque converter clutch. The clutch control module determines a desired torque value for the torque converter clutch and controls the pressure applied to the torque converter clutch based on the desired torque value.

The clutch control module determines the desired torque value based on a torque output of the engine, torque drawn from the engine by a pump of the torque converter, inertia of the engine, and a desired engine acceleration (e.g., positive or negative). The desired engine acceleration is calibrated to limit fluctuations in the amount of torque drawn from the engine and prevent observable fluctuations in the engine output speed.

Figure 3:
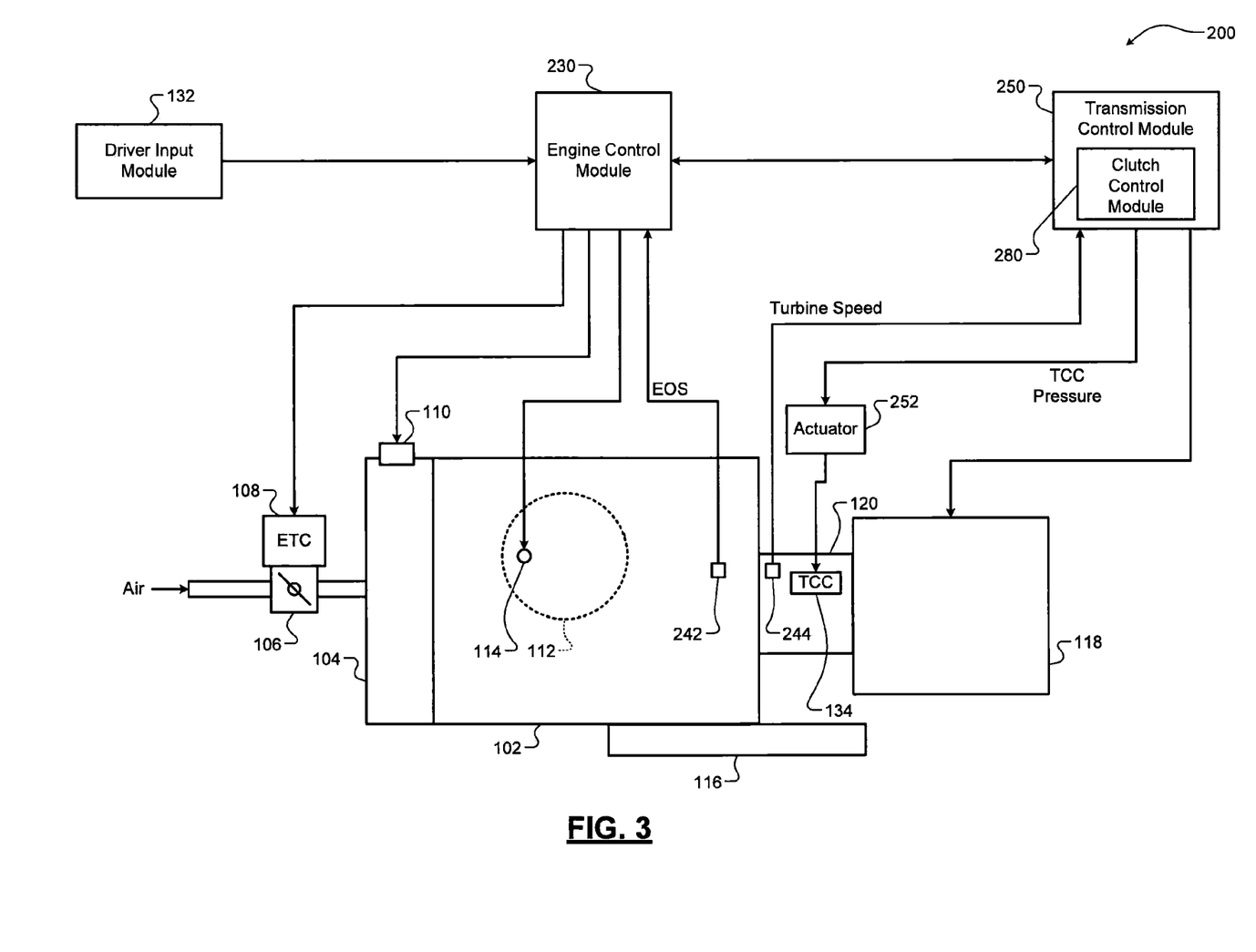
FIG. 3 is a functional block diagram of an exemplary implementation of a powertrain system according to the principles of the present disclosure.

Referring now to FIG. 3, a functional block diagram of an exemplary powertrain system 200 is presented. The powertrain system 200 includes the engine 102 that combusts an air/fuel mixture to produce drive torque. The engine 102 may be any suitable type of engine, such as a diesel-type engine, a gasoline-type engine, or a hybrid-type engine. Air is drawn into the intake manifold 104 through the throttle valve 106. The electronic throttle controller (ETC) 108 regulates opening of the throttle valve 106 to control the amount of air drawn into the intake manifold 104.

Air from the intake manifold 104 is drawn into cylinders of the engine 102. While the engine 102 may include multiple cylinders, for illustration purposes, the single representative cylinder 112 is shown. For example only, the engine 102 may include 2, 3, 4, 5, 6, 8, 10, and/or 12 cylinders. The fuel injector 110 injects fuel that mixes with the air and creates the air/fuel mixture. In various implementations, the fuel injector 110 injects fuel into the intake manifold 104 at a central location or at multiple locations, such as near an intake valve (not shown) associated with the cylinder 112. In other implementations, the fuel injector 110 injects fuel directly into the cylinder 112.

A piston (not shown) within the cylinder 112 compresses the air/fuel mixture within the cylinder 112. A spark provided by the spark plug 114 ignites the air/fuel mixture. The timing of the spark may be specified relative to the time when the piston is at its topmost position, referred to as to top dead center (TDC). When the piston reaches the TDC position, the air/fuel mixture is most compressed. While the engine 102 is described as including the spark plug 114, the spark plug 114 may not be necessary to initiate combustion in other engine systems, such as a diesel-type engine system.

The combustion of the air/fuel mixture drives the piston down (i.e., away from the TDC position), rotatably driving a crankshaft (not shown) and generating torque. After the piston reaches a bottom most position, referred to as bottom dead center (BDC), the piston begins moving up again (i.e., toward the TDC position) and expels the byproducts of combustion to the exhaust system 116. The powertrain system 200 may also include one or more electric motors (not shown) that may be used to supply torque.

An engine control module (ECM) 230 regulates torque output of the engine 102 based on, for example, various operating parameters and/or driver inputs. The driver inputs include, for example, an accelerator pedal position and a brake pedal position. The driver input module 132 receives the driver inputs and transmits the driver inputs to the ECM 230. The operating parameters include, for example, the mass airflow (MAF), manifold absolute pressure (MAP), intake air temperature (IAT), coolant temperature, oil temperature, and/or any other suitable operating parameter.

An engine speed (EOS) sensor 242 measures the output speed of the engine 102 and generates an EOS signal accordingly. For example only, the EOS sensor 242 generates the EOS signal based on rotation of the output shaft 127. More specifically, the EOS signal may be generated based on rotation of an N-toothed wheel (not shown) that is attached to the output shaft 127 of the engine 102.

Torque output by the engine 102 is transferred to the transmission 118 via the torque converter 120. Specifically, the torque converter 120 transfers torque from the output shaft 127 of the engine 102 to the input shaft 128 of the transmission 118. The input shaft 128 drives a transmission output shaft (not shown), which transfers the torque to one or more wheels of the vehicle.

The torque converter 120 includes the turbine 122, the pump 124, and the torque converter clutch (TCC) 134. The TCC 134 is referred to as a lock-up clutch. A turbine speed sensor 244 measures the rotational speed of the turbine 122 and generates a turbine speed signal accordingly. In other implementations, the turbine speed may be measured based on the rotational speed of the input shaft 128 of the transmission 118 and/or any other suitable measure of the turbine speed.

The TCC 134 controls the amount of torque transferred from the engine 102 to the transmission 118. The TCC 134 is generally in one of two states: a locked state or a slipping state. When in the locked state, the TCC 134 is applied to lock the turbine 122 and the pump 124. In this manner, the torque output by the engine 102 is directly transferred to the input shaft 128 of the transmission 118. The torque converter 120 may also provide a gain when the TCC 134 is in the unlocked state. For example only, the gain may be approximately 2.0.

When in the slipping state, the TCC 134 is partially engaged to allow the turbine 122 to slip with respect to the pump 124 and rotate at a slower speed than the pump 124. The difference between the rotational speed of the pump 124 and the turbine 122 in revolutions per minute (rpm) is referred to as the slip value. The pump speed may be based on, for example, the EOS and/or any other suitable measure of the pump speed. For example only, the slip value be expressed by the equation:

$$\text{Slip Value} = \text{EOS} - \text{Turbine Speed}, \quad (1)$$

where EOS is the engine output speed (rpm).

A transmission control module (TCM) 250 is electrically connected to and communicates with the ECM 230. The TCM 250 controls various operations associated with the transmission 118, such as the application of the TCC 134 and gear shifting within the transmission 118. An actuator 252 controls the application of the TCC 134 based on commands from the TCM 250.

The actuator 252 controls the TCC 134 in any suitable manner. For example only, the actuator 252 actuates based on the command from the TCM 250, thereby adjusting the pressure of fluid applied to one side of the TCC 134. Such a command is referred to as a TCC pressure command. Applying pressure to the one side of the TCC 134 causes the TCC 134 to be applied based on the pressure. In this manner, the pressure applied to the TCC 134 controls the slip value. For example only, the slip value decreases as the pressure applied to the TCC 134 increases.

During normal engine operation, the TCM 250 controls pressure applied to the TCC 134 to maintain the slip value at a predetermined value or within a predetermined range. For example only, the TCM 250 may maintain the slip value between approximately 30.0 rpm and 100.0 rpm during normal engine operation. In some circumstances, however, the TCM 250 transitions the TCC 134 to the locked state. For example, the TCM 250 may transition the TCC 134 to the locked state when the vehicle speed is greater than a predetermined speed (e.g., 40.0 miles per hour) and/or when the gear ratio is greater than a predetermined gear ratio (e.g., a gear ratio corresponding to second gear).

The TCM 250 includes a clutch control module 280 that generates TCC pressure commands for the actuator 252. In this manner, the clutch control module 280 controls application of the TCC 134 and the slip value. Application of the TCC 134 draws torque from the engine 102 when the input speed of the transmission 118 is less than the EOS.

The clutch control module 280 according to the principles of the present application determines a TCC torque value based on inertia of the engine 102, a desired engine acceleration, the torque output of the engine 102, and torque absorbed by the pump 124. The TCC torque value corresponds to a desired amount of torque to be drawn by the TCC 134 that will cause the EOS to accelerate based on the desired engine acceleration. The desired engine acceleration corresponds to an acceleration of the EOS that will produce a desired feeling for the driver. While the term acceleration will be used, the acceleration can be positive or negative.

The clutch control module 280 determines the TCC pressure command based on the TCC torque value. The TCC pressure command corresponds to the pressure to be applied to the TCC 134 based on the TCC torque value. The actuator 252 actuates based on the TCC pressure command and, therefore, pressure is applied to the TCC 134 based on the TCC pressure command. In this manner, the clutch control module 280 provides the desired shift feeling while the TCC 134 is applied. While the clutch control module 280 is depicted as being located within the TCM 250, the clutch control module 280 may be located in any suitable location, such as external to the TCM 250. The clutch control module 280 may be located within any other module or system.

Figure 4:
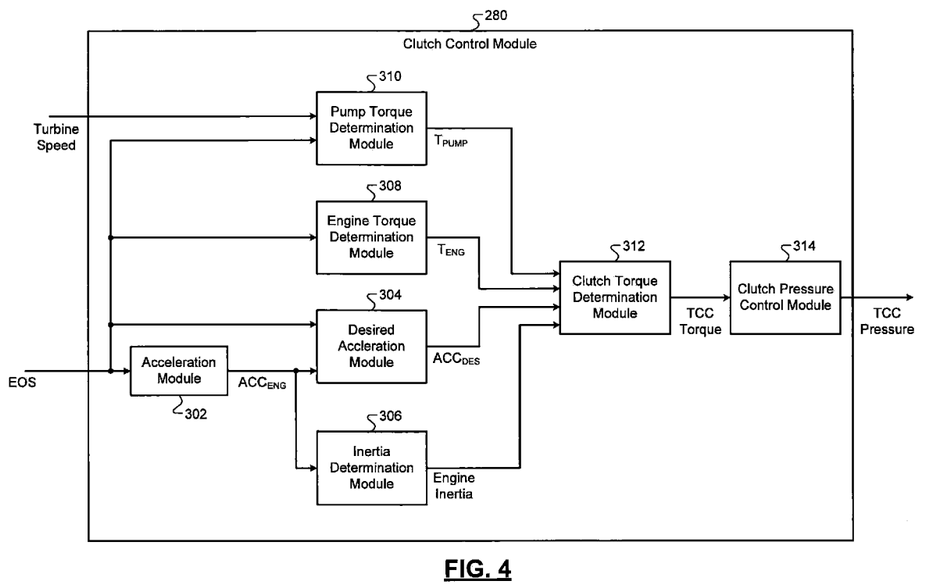
FIG. 4 is a functional block diagram of an exemplary implementation of a clutch control module according to the principles of the present disclosure.

Referring now to FIG. 4, a functional block diagram of an exemplary implementation of the clutch control module 280 is presented. The clutch control module 280 includes an acceleration module 302, a desired acceleration module 304, an inertia determination module 306, an engine torque determination module 308, and a pump torque determination module 310. The clutch control module 280 also includes a clutch torque determination module 312 and a clutch pressure control module 314.

The acceleration module 302 determines an engine acceleration value ($ACC_{ENG}$) based on the EOS. In various implementations, the acceleration module 302 determines the engine acceleration value based on a change in the EOS over a period of time. In other implementations, the acceleration module 302 may determine the engine acceleration value based on a derivative of the EOS and/or any suitable measure of engine acceleration.

The desired acceleration module 304 determines a desired acceleration value ($ACC_{DES}$). The desired acceleration value corresponds to an acceleration of the EOS (e.g., positive or negative) with respect to the current engine acceleration that will produce a desired feel for the driver of the vehicle. The desired acceleration module 304 determines the desired acceleration value based on the engine acceleration value, the EOS, and/or one or more lookup tables. The desired acceleration module 304 may also determine the desired acceleration value based on heating of the TCC 134 that occurs when the TCC 134 is applied.

The inertia determination module 306 determines an engine inertia value based on the engine acceleration value and/or the EOS. The engine inertia value corresponds to inertia (kg) of the engine 102 under the current conditions. For example only, the inertia determination module 306 may determine the engine inertia value from one or more lookup tables based on the engine acceleration and/or the EOS. The lookup tables include calibrated engine inertia values that are calibrated based on characteristics of the engine 102 and/or various components of the engine 102.

The engine torque determination module 308 determines an engine torque value ($T_{ENG}$) based on torque output by the engine 102. The engine torque determination module 308 may determine the engine torque value in any suitable manner. For example, the torque output may be measured using a torque sensor (not shown) in some implementations. In other implementations, the torque output may be calculated based on, for example, the engine acceleration value, the EOS, the MAF, the MAP, the air/fuel mixture, and/or any other suitable engine parameters.

The pump torque determination module 310 determines a pump torque value ($T_{PUMP}$) based on the turbine speed and the EOS. In other words, the pump torque determination module 310 determines the pump torque value based on the slip value. The pump torque value corresponds to torque absorbed by the pump 124 under the current conditions. The pump torque value may also be determined based on the gain that the torque converter 120. For example only, the torque converter 120 may provide a gain of approximately 2.0 when in the unlocked state.

The clutch torque determination module 312 determines a TCC torque value based on the pump torque value, the engine torque value, the desired acceleration value, and the engine inertia value. The TCC torque value corresponds to a desired amount of torque to be drawn by the TCC 134 that will cause the EOS to accelerate based on the desired engine acceleration. For example only, the clutch torque determination module 312 determines the TCC torque value using the equation:

$$\text{TCC Torque} = T_{ENG} - T_{PUMP} - (\text{Engine Inertia} * ACC_{DES}), \quad (2)$$

where $T_{ENG}$ is the engine torque value, $T_{PUMP}$ is the pump torque value, and $ACC_{DES}$ is the desired acceleration value.

The clutch pressure control module 314 generates the TCC pressure command based on the TCC torque value. The TCC pressure command corresponds to pressure to be applied to the TCC 134 to effectuate the TCC torque value. In other words, the TCC pressure command to pressure to be applied to the TCC 134 to adjust the engine acceleration value to the desired engine acceleration value. For example only, the clutch pressure control module 314 may determine the TCC pressure command from a lookup table of TCC pressure commands indexed by TCC torque value.

The TCC pressure command is provided to the actuator 252 which actuates based on the TCC pressure command, applying pressure to the TCC 134 according to the TCC pressure command. Accordingly, pressure is applied to the TCC 134 to accelerate the EOS based on the desired engine acceleration and produce a desired feeling while the TCC 134 is transitioned to the locked state.

Figure 5:
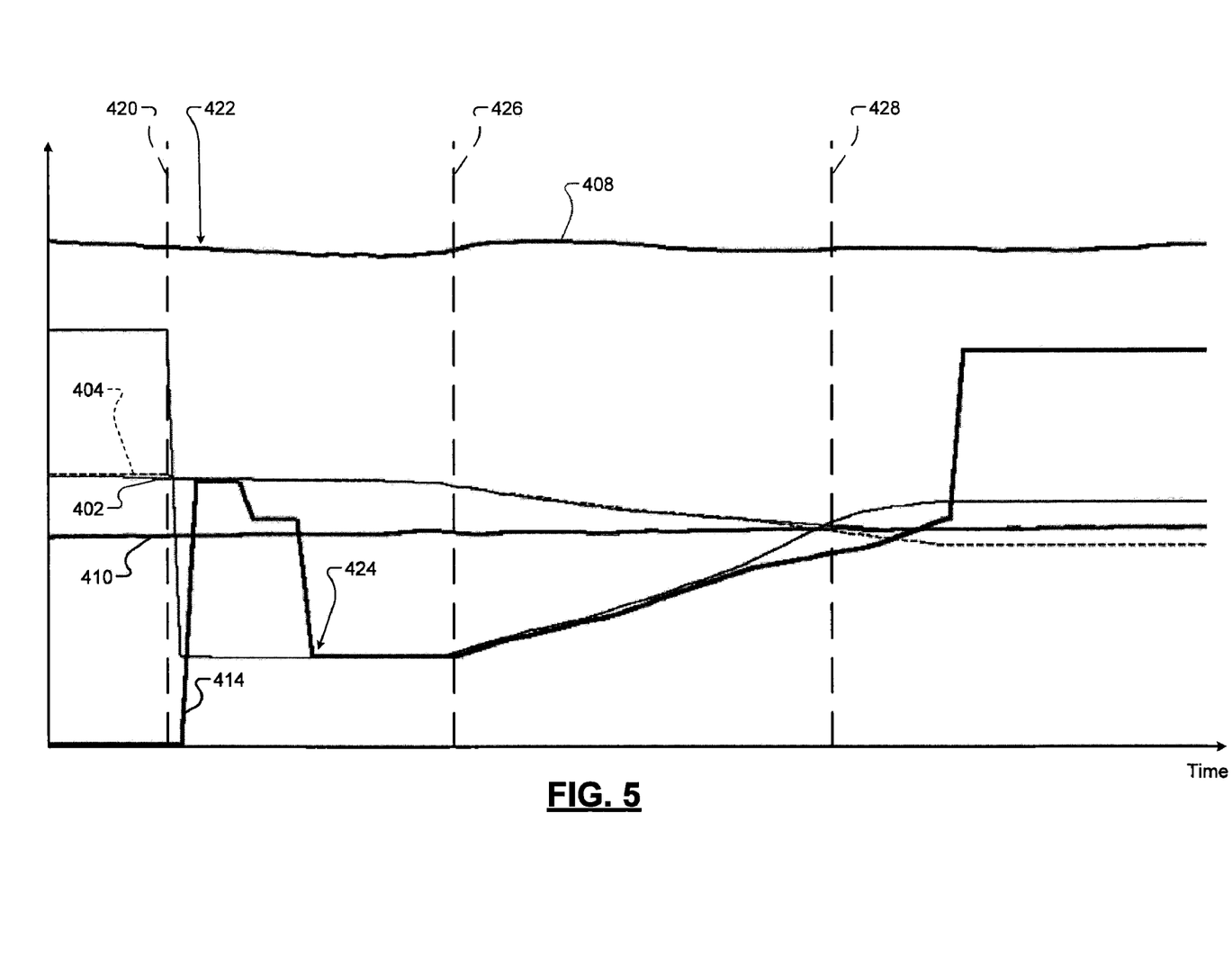
FIG. 5 is a graphical illustration of operation of the clutch control module according to the principles of the present disclosure.

Referring now to FIG. 5, a graphical illustration of operation of the clutch control module 280 is presented. Line 402 corresponds to an exemplary EOS trace. The engine acceleration value is determined based on the EOS 402. The engine inertia value is also determined based on the EOS and/or other engine characteristics.

Line 404 corresponds to an exemplary desired EOS trace. The desired engine acceleration value is determined based on the desired EOS 404. Line 408 represents an exemplary engine torque trace. Line 410 corresponds to an exemplary turbine speed trace. The pump torque value is determined based on the turbine speed 410 and the EOS 402. In other words, the pump torque value is determined based on the slip value. Line 414 corresponds to an exemplary TCC pressure command trace.

At time 420, the transition of the TCC 134 from the slipping state to the locked state is commanded. For example only, the TCM 250 may command the transition to the locked state when the vehicle speed is greater than a predetermined speed and/or when the gear ratio reaches a predetermined ratio. When the transition is commanded at time 420, the TCC pressure command 414 is increased to ready the TCC 134 for the transition to the locked state. The TCC 134 may be readied by, for example, increasing the pressure of fluid surrounding the TCC 134.

Once the TCC 134 is readied, torque is drawn from the engine torque 408 when the TCC 134 is applied as shown at 422. The TCC pressure command 414 is then decreased to a stable value as shown at 424. At time 426, the clutch control module 280 begins adjusting TCC pressure command 414 based on equation (2) above using the engine inertia, the engine torque 408, the desired engine acceleration, and the pump torque. The clutch control module 280 adjusts the TCC pressure command 414 to adjust the EOS 402 based on the desired EOS 404. In this manner, the driver is provided with a desired feeling throughout the transition of the TCC 134 to the locked state. At time 428, the transition to the locked state is completed as the EOS 402 reaches the turbine speed 410.

Figure 6:
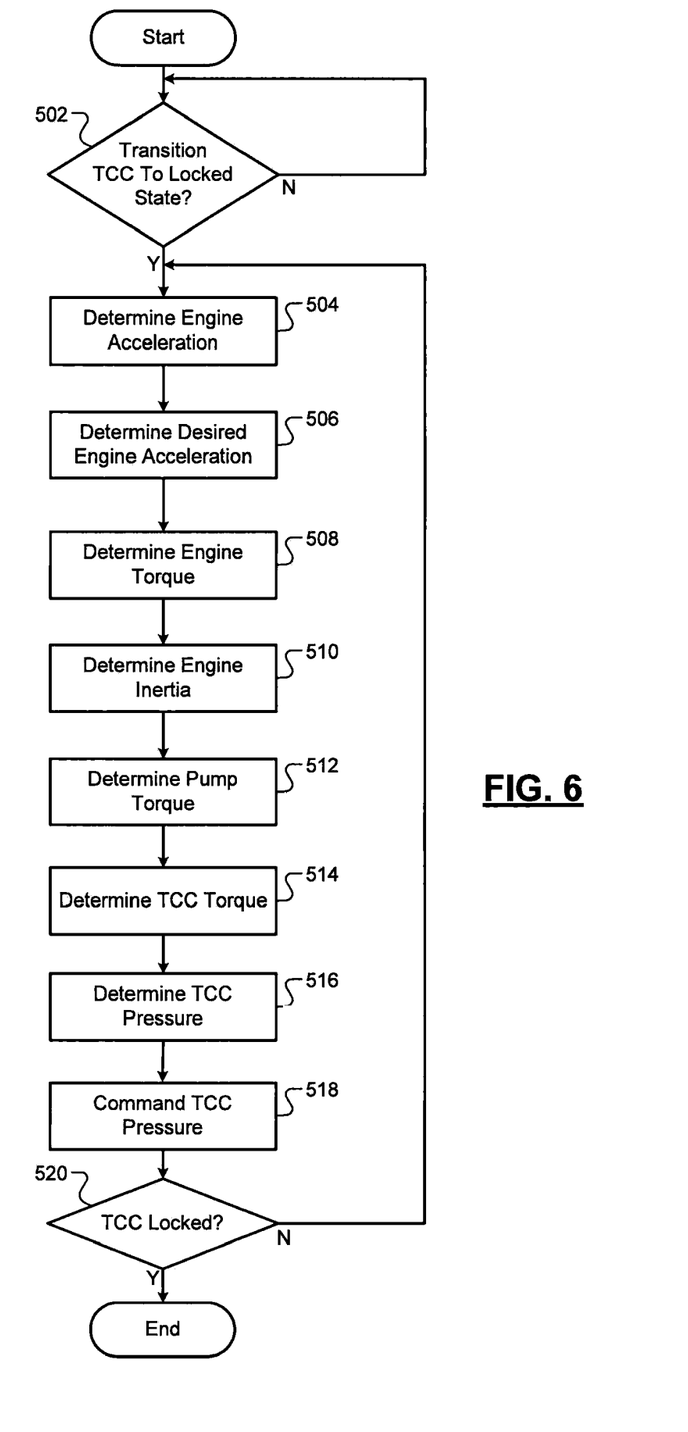
FIG. 6 is a flowchart depicting exemplary steps performed by the clutch control module according to the principles of the present disclosure.

Referring now to FIG. 6, a flowchart depicting exemplary steps performed by the clutch control module 280 is presented. Control begins in step 502 where control determines whether to transition the TCC 134 to the locked state. If true, control continues to step 504. If false, control remains in step 502. Control may determine whether to transition the TCC 134 to the locked state based on, for example, the vehicle speed, the gear ratio, and/or any other suitable parameter.

In step 504, control determines the engine acceleration value. Control determines the engine acceleration value based on the EOS. For example, control may determine the engine acceleration value based on a change in the EOS over a period of time, a derivative of the EOS, and/or any other suitable measure of engine acceleration.

Control continues in step 506 where control determines the desired engine acceleration value. Control may determine the desired engine acceleration value from one or more lookup tables based on the EOS, the engine acceleration value, and/or a desired EOS. The desired engine acceleration corresponds to an acceleration of the EOS that will produce a desired feeling for the driver.

In step 508, control determines the engine torque value. The engine torque value corresponds to the torque output by the engine 102. Control determines the engine inertia value in step 510. Control may determine the engine inertia value based on the engine acceleration, the EOS, characteristics of the engine 102, and/or various components of the engine 102.

Control continues to step 512 where control determines the pump torque value. Control determines the pump torque value based on the EOS and the turbine speed. In other words, control determines the pump torque value based on the slip value.

In step 514, control determines the TCC torque value. Control determines the TCC torque value based on the engine torque value, the pump torque value, the engine inertia value, and/or the desired acceleration value. More specifically, control determines the TCC torque value using equation (2), as described above. The TCC torque value corresponds to torque necessary to accelerate the EOS based on the desired EOS. In other words, the TCC torque value corresponds to torque necessary to cause the EOS to accelerate based on the desired acceleration value.

Control determines the TCC pressure in step 516. The TCC pressure corresponds to pressure necessary to apply to the TCC 134 to create the TCC torque value. In other words, the TCC pressure corresponds to the pressure necessary to apply to the TCC 134 to adjust the engine acceleration to the desired acceleration value.

Control commands the TCC pressure in step 518. Control continues to step 520 where control determines whether the TCC has reached the locked state. If true, control ends. If false, control returns to step 504. Control may determine whether the TCC 134 is in the locked state in any suitable manner. For example, control determines that the TCC 134 is in the locked state when the turbine speed is equal to the EOS.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A clutch control system comprising:
a clutch torque determination module that determines a desired torque value for a torque converter clutch (TCC) based on a torque output of an engine, a pump torque value for a pump integrated with a torque converter, a desired engine acceleration, and an inertia value of said engine; and
a clutch pressure control module that selectively controls pressure applied to said TCC based on said desired torque value.

2. The clutch control system of claim 1 wherein said clutch torque determination module determines said desired torque value based on a difference between said torque output of said engine and a sum of said pump torque value and a product of said inertia value and said desired engine acceleration.

3. The clutch control system of claim 1 wherein said desired acceleration is determined relative to a current engine acceleration.

4. The clutch control system of claim 1 wherein said desired engine acceleration is determined based on an estimated heating value for said TCC.

5. The clutch control system of claim 1 wherein said pump torque value is determined based on an engine speed and a speed of a turbine integrated with said torque converter.

6. The clutch control system of claim 5 wherein said pump torque value is determined further based on a gain of said torque converter.

7. The clutch control system of claim 5 wherein said clutch pressure control module is disabled when said engine speed is approximately equal to said turbine speed.

8. The clutch control system of claim 1 wherein said clutch pressure control module controls said pressure applied to said TCC further based on a lookup table of pressures indexed by desired torque values.

9. The clutch control system of claim 1 further comprising an actuator that applies pressure to said TCC based on a TCC pressure command,
wherein said clutch pressure control module generates said TCC pressure command based on said desired torque value.

10. The clutch control system of claim 9 wherein said actuator applies a fluid pressure to said TCC based on said TCC pressure command.

11. A method comprising:
determining a desired torque value for a torque converter clutch (TCC) based on a torque output of an engine, a pump torque value for a pump integrated with a torque converter, a desired engine acceleration, and an inertia value of said engine; and
selectively controlling pressure applied to said TCC based on said desired torque value.

12. The method of claim 11 wherein said desired torque value is determined based on a difference between said torque output of said engine and a sum of said pump torque value and a product of said inertia value and said desired engine acceleration.

13. The method of claim 11 further comprising determining said desired acceleration relative to a current engine acceleration.

14. The method of claim 11 further comprising determining said desired engine acceleration based on an estimated heating value for said TCC.

15. The method of claim 11 further comprising determining said pump torque value based on an engine speed and a speed of a turbine integrated with said torque converter.

16. The method of claim 15 wherein said pump torque value is determined further based on a gain of said torque converter.

17. The method of claim 15 further comprising disabling said selectively controlling pressure when said engine speed is approximately equal to said turbine speed.

18. The method of claim 11 wherein said pressure applied to said TCC is controlled further based on a lookup table of pressures indexed by desired torque values.

19. The method of claim 11 further comprising:
generating a TCC pressure command based on said desired torque value; and
applying pressure to said TCC based on a TCC pressure command.

20. The method of claim 19 wherein said applying pressure comprises applying a fluid pressure to said TCC based on said TCC pressure command.

* * * * *